Oct. 23, 1934.  M. B. BECK ET AL  1,977,613
STREET LIGHTING LUMINAIR
Filed July 6, 1931  5 Sheets-Sheet 1

INVENTOR.
Morris B. Beck
John D. Whittaker
BY Harry Lea Dodson
ATTORNEYS.

Oct. 23, 1934.                M. B. BECK ET AL                1,977,613
                           STREET LIGHTING LUMINAIR
                             Filed July 6, 1931          5 Sheets-Sheet 2

INVENTOR.
Morris B. Beck.
John D. Whittaker
BY Harry Lea Dodson
                ATTORNEYS.

Oct. 23, 1934.   M. B. BECK ET AL   1,977,613
STREET LIGHTING LUMINAIR
Filed July 6, 1931    5 Sheets-Sheet 3

FIG. 7.

STREET LIGHTING DATA.
PROTOTYPE CURVE VALUES FOR UNIFORM HORIZONTAL ILLUMINATION.
Formulae:

When $\alpha$ is less than $\tan^{-1}\frac{M}{2}$ ...... $(c.p.)\alpha = K\dfrac{1+\sin\cos^{-1}\frac{\tan\alpha}{\frac{1}{2}M}}{\cos^3\alpha}$ When $\alpha$ is less than $\tan^{-1}\frac{M}{2}$ ...... $(c.p.)\alpha = K\dfrac{1-\sin\cos^{-1}\frac{M-\tan\alpha}{\frac{1}{2}M}}{\cos^3\alpha}$

| Angle $\alpha$ | Equated to 100 c.p. at $\alpha=0$ ||||| Equated to curve of 1000 lumens |||||
|---|---|---|---|---|---|---|---|---|---|---|
| | M=4 | M=6 | M=8 | M=12 | M=16 | M=4 | M=6 | M=8 | M=12 | M=16 |
| 0° | 100 | 100 | 100 | 100 | 100 | 74 | 39 | 19 | 9 | 5 |
| 5° | 101 | 101 | 101 | 101 | 101 | 74 | 40 | 19 | 9 | 5 |
| 15° | 111 | 111 | 111 | 111 | 111 | 81 | 44 | 21 | 10 | 6 |
| 25° | 133 | 134 | 134 | 135 | 135 | 98 | 52 | 25 | 12 | 7 |
| 35° | 177 | 180 | 181 | 181 | 182 | 130 | 70 | 33 | 16 | 9 |
| 45° | 264 | 275 | 278 | 281 | 282 | 195 | 108 | 52 | 25 | 14 |
| 55° | 450 | 497 | 512 | 522 | 525 | 331 | 195 | 95 | 46 | 27 |
| 60° | 600 | . | . | . | . | 442 | . | . | . | . |
| 61° | 628 | . | . | . | . | 463 | . | . | . | . |
| 62° | 648 | . | . | . | . | 477 | . | . | . | . |
| 63° | 637 | . | . | . | . | 470 | . | . | . | . |
| 64° | 462 | . | . | . | . | 340 | . | . | . | . |
| 65° | 415 | 1126 | 1222 | 1281 | 1301 | 306 | 441 | 227 | 113 | 66 |
| 67°30' | . | 1422 | . | . | . | . | 557 | . | . | . |
| 70° | 276 | 1752 | 2159 | . | . | 204 | 687 | 400 | . | . |
| 71° | . | 1813 | . | . | . | . | 710 | . | . | . |
| 72° | . | 1312 | . | . | . | . | 514 | . | . | . |
| 72°30' | . | . | 2959 | . | . | . | . | 548 | . | . |
| 74° | . | 1083 | . | . | . | . | 425 | . | . | . |
| 75° | 26 | . | 3930 | 5155 | 5445 | 19 | . | 729 | 454 | 276 |
| 75°58' | 0 | . | . | . | . | 0 | . | . | . | . |
| 76° | . | 888 | 3272 | . | . | . | 348 | 606 | . | . |
| 77°30' | . | . | . | 8180 | . | . | . | . | 721 | . |
| 78° | . | 545 | 2407 | . | . | . | 213 | 446 | . | . |
| 80° | . | . | 1784 | 12665 | 16270 | . | . | 331 | 1114 | 824 |
| 80°32' | . | 0 | . | . | . | . | 0 | . | . | . |
| 80°52' | . | . | 0 | . | . | . | . | 0 | . | . |
| 81° | . | . | . | 8895 | 21070 | . | . | . | 783 | 1066 |
| 82° | . | . | . | 7775 | 27025 | . | . | . | 685 | 1369 |
| 82°30' | . | . | . | . | 29550 | . | . | . | . | . |
| 82°52' | . | . | . | . | 26100 | . | . | . | . | 1321 |
| 83° | . | . | . | 6460 | 22400 | . | . | . | 569 | 1133 |
| 84° | . | . | . | 3940 | 18150 | . | . | . | 347 | 920 |
| 85° | . | . | . | . | 11050 | . | . | . | . | 560 |
| 85°14' | . | . | . | 0 | . | . | . | . | 0 | . |
| 86°25' | . | . | . | . | 0 | . | . | . | . | 0 |
| | K=50 | K=50 | K=50 | K=50 | K=50 | K=36.8 | K=19.6 | K=9.27 | K=4.40 | K=2.53 |

FIG. 9.

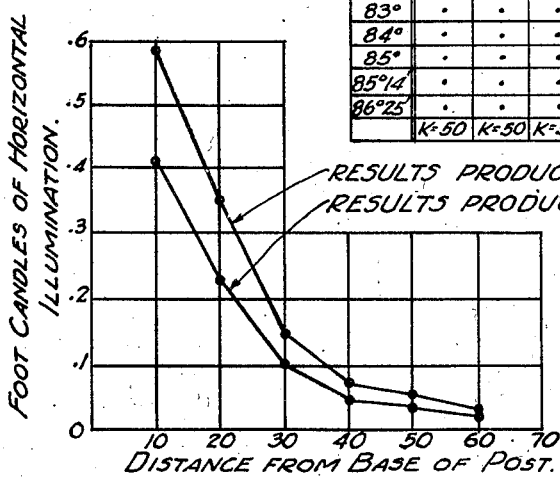

RESULTS PRODUCED BY OUR PROCESS.
RESULTS PRODUCED BY REFRACTION.

INVENTOR.
Morris B. Beck
John D. Whittaker
BY Harry Lea Dodson
ATTORNEYS.

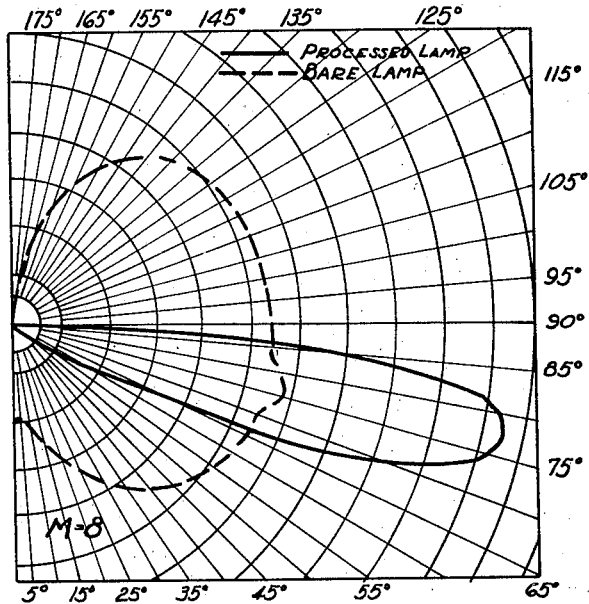
FIG. 8.
FIG. 10.
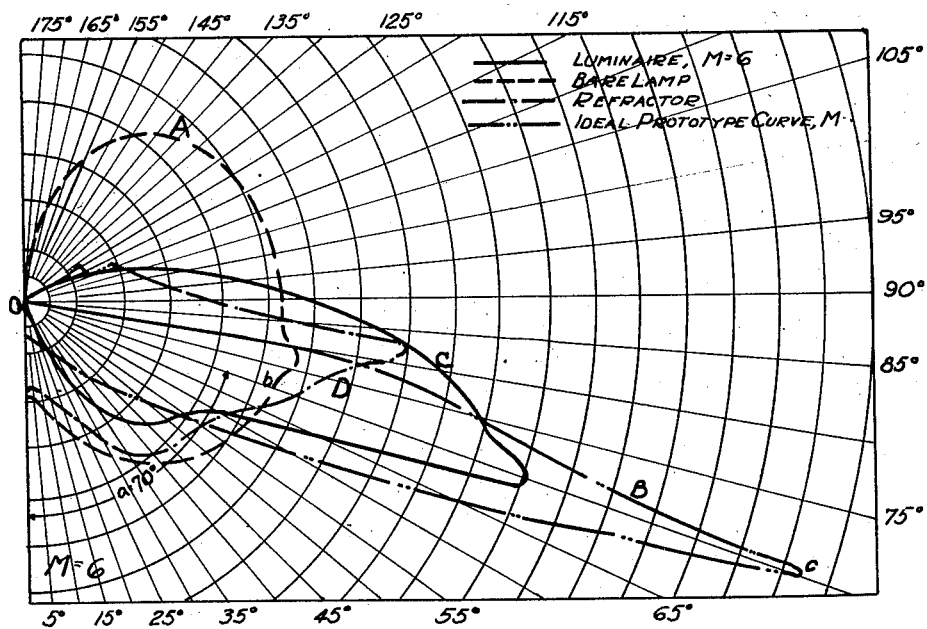

Oct. 23, 1934.    M. B. BECK ET AL    1,977,613
STREET LIGHTING LUMINAIR
Filed July 6, 1931    5 Sheets-Sheet 5
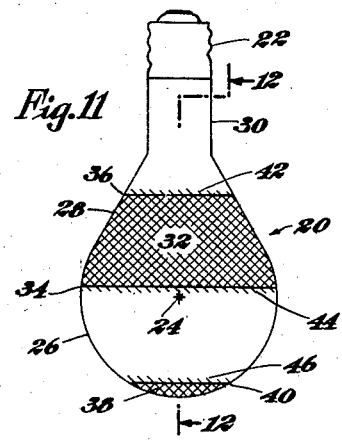
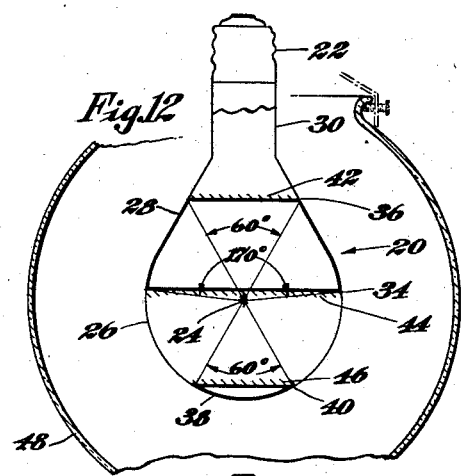
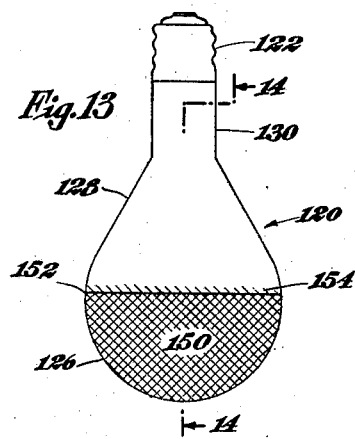
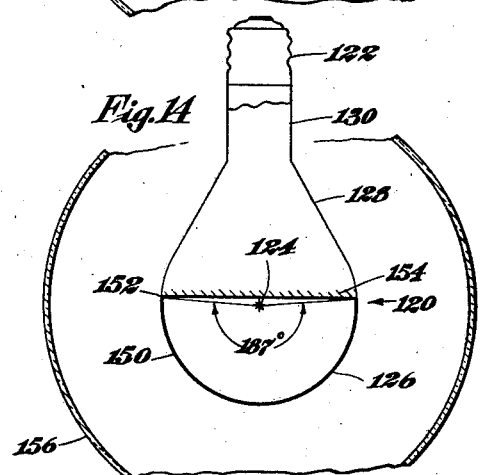
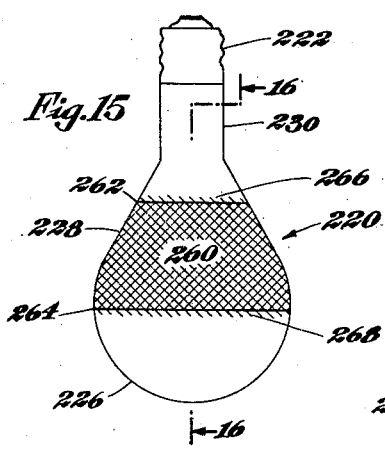
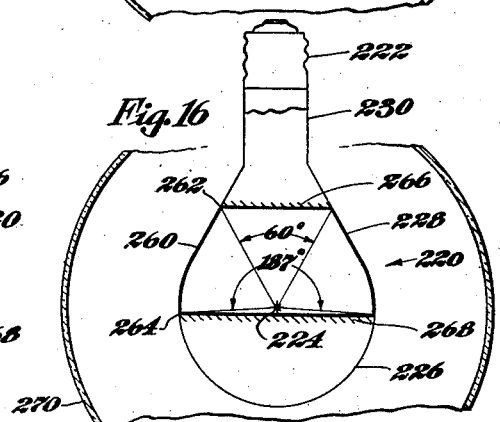
INVENTORS
Morris B. Beck,
John D. Whittaker;
BY
ATTORNEY

UNITED STATES PATENT OFFICE

1,977,613

STREET LIGHTING LUMINAIR

Morris B. Beck, New York, and John D. Whittaker, Babylon, N. Y., assignors to Welsbach Street Lighting Company of America, Philadelphia, Pa., a corporation of Delaware Application July 6, 1931, Serial No. 548,952

4 Claims. (Cl. 240—25)

Our invention relates generally to that class of street lights which are set forth in our patent for Street illumination No. 1,891,136.

In the pursuit of ideal street lighting the analysis of adequate street lighting requirements as set forth in said patent, make it necessary to determine the ideal light-distribution curves which are utilizable for lighting the street surfaces for the various ratios of spacing distances to mounting heights. Such ideal light-distribution curves are called prototype curves.

Prototype curves will therefore be understood to be families of curves which will produce a predetermined character of illuminating effect under varying conditions of spacing distance and mounting height. The curves belonging to any one family are distinguished from each other by the circumstance that each curve relates to a different ratio of spacing distance to mounting height, and so long as this ratio is not varied, the relative distribution of light over the illuminated area will follow the same law, no matter how the spacing distance and mounting height are varied.

Our invention has been illustrated herein, as also in the aforementioned Patent No. 1,891,136, by way of example, in relation to a system of prototype curves for attaining illumination in which the aim is to have the horizontal illumination intensity at any point of the surface of a street equal to that at any other point; in other words, the illumination of the surface will be uniform. This type of illumination is advocated by many illuminating engineers, but it will be obvious that our invention is equally applicable to prototype street illumination in which uniformity of this type is not contemplated.

Prototype illumination requires further that the normal spherical distribution from the source be modified to give a non-spherical distribution.

In the embodiment herein disclosed, just as in said Patent 1,891,136, we show the attainment of prototype illumination by the association with a bulb, of reflecting areas, illustrated in the embodiment as formed by coating certain portions of the bulb surface with an opaque specular reflecting substance which will redistribute the light from the source in accordance with the desired prototype.

Prototype illumination arrived at as above set forth is characterized in a number of ways and one of these is the fact that it is only an approximation to the ideal desired.

Attainment of such ideal distribution in practice is frequently very difficult, and a case in point occurs when a bulb with a silvered area at the tip is employed, this type being illustrated in Figures 11 and 12.

Another characteristic is the sharpness of definition incident to specular reflection, and to the "cut-off", that is, the abrupt transition in the light emission to a zero value at the edge of the reflecting surface.

This is quite noticeable where an outer globe is used, since the conventional globes in practical use are more or less diffusing and the "cut-off", above referred to, causes a shadow on the globe.

Among the objects of our invention is the provision of an arrangement whereby such characteristics of light distribution attained in the manner set forth in the aforementioned earlier application are modified. We accomplish this by treating certain zonal portions adjacent the portions coated with the opaque specular-reflective substance so as to make them diffusing. In this manner we can, without interfering with the more highly efficient and desirable uniform horizontal illumination resulting from a bulb so treated for prototype distribution, so soften modify or supplement certain portions of the light flux as to attain the desired results. The purpose of such modification may be, for instance, to break up images and sharp outlines resulting from specular reflections or to reduce glare at certain angles where this is objectionable.

Then again it may be used to reduce the abrupt transition at the edges of the reflecting surfaces, heretofore referred to as the "cut-off". When used for this purpose its effect is technically known as "fading out the cut-off."

The purpose may also be to bring the practical approximation to the prototype closer to the ideal by flattening out bulges, as for instance, in the form of Figures 11 and 12 which shows a bulb intended to burn in a position with its base up. In this case, if no globe is used and no diffusing areas are formed on the bulb the silvered tip will throw a dark spot or shadow. If a diffusing globe is used but the bulb has no diffusing areas, the shadow is somewhat reduced, but a sharp shadow line appears on the globe.

It is also contemplated in this manner to reduce the light emission in certain directions, since, as is well known, diffusion is usually accompanied by a loss of light to a certain extent, due to increased absorption of the light by the diffusing medium.

The characteristics of light distribution—that is, the relative illumination of all the various points of the illuminated area,—will remain constant so long as the ratio between lamp separations and mounting heights remains constant. It follows, therefore, that if the prototype light-distribution curve of uniform horizontal street surface illumination be derived that any ratio between lamp separations and mounting heights, for such prototype curve will apply, whatever the actual separations and mounting heights, so long as the ratio of these two quantities remains constant.

This ratio has been called M. In other words $$M = \frac{\text{distance between adjacent light units}}{\text{height of light unit above street}}$$

Our invention has for its object a street lighting bulb which will constitute a concrete embodiment of the invention set forth in the said application with the addition of means for modifying or softening the prototype light-distribution curve for locations where such modification may be deemed beneficial. As therein described we have set forth with great accuracy the status of the problem of planned scientific street lighting before our invention was discovered. This status was, briefly, that it was considered impossible to produce a desired prototype illumination without the aid of outside accessories in addition to the outer enclosing globe and the electric light bulb.

For the purpose of deriving the light-distribution curves for obtaining uniform horizontal illumination on the street surface, we have used the well known formulæ (1) and (2), given below:

*Formulæ*

When $a$ is less than $$\tan^{-1}\frac{M}{2}\text{-------}(cp)a = K\frac{1 - \sin \cos^{-1}\frac{\tan a}{\frac{1}{2}M}}{\cos^3 a}$$

When $a$ is greater than $$\tan^{-1}\frac{M}{2}\text{-------}(cp)a = K\frac{1 - \sin \cos^{-1}\frac{M - \tan a}{\frac{1}{2}M}}{\cos^3 a}$$

The symbols used in these formulæ are fully explained in what follows.

It is possible for one sufficiently versed in mathematics by means of these formulæ, to ascertain, with the aid of the data herein presented, how such curves are constructed, reference being made to the accompanying drawings.

We shall proceed to describe the invention by which we are able, as demonstrated in actual street lighting practice, to accomplish the objects herein set forth.

Referring specifically to the drawings:

Fig. 4 is a diagram showing the relation of varying spacing distances to mounting heights for the values of M corresponding to Fig. 1;

Fig. 5 is a diagram showing the relation of varying spacing distances to mounting heights for the values of M corresponding to Fig. 2;

Fig. 6 is a diagram showing the relation of varying spacing distances to mounting heights for the vaules of M corresponding to Fig. 3;

Fig. 7 is a tabulation of prototype curve, candlepower values when various values of M are substituted in formulæ (1) and (2);

Fig. 8 is a comparison of a light-distribution curve actually attained in practice from a street lighting unit constructed in accordance with our process with the light-distribution curve, of a bare gas-filled, tungsten-filament, incandescent, series street-lamp;

Fig. 9 is a graph showing results obtained in an actual street lighting installation, utilizing a street lighting unit, constructed in accordance with our process, in comparison with a street lighting unit constructed by an exponent of the handling of light by refraction as hereinbefore outlined;

Fig. 10 is a comparison of the light distribution curves of a bare lamp, a street lighting unit constructed in accordance with our process, and the ideal prototype curve for $M=6$, together with a distribution curve from a street lighting unit actually constructed by an exponent of the handling of light by refraction as hereinbefore outlined.

Figure 11 shows one embodiment of our invention, in which a prototype bulb is provided with diffusing portions;

Figure 12 is a view, partly in section along the line 12—12 of Figure 11, showing the angular relation of the reflecting surfaces to the luminous source and also showing an outer enclosing globe;

Figure 13 is a view of another embodiment of our invention;

Figure 14 is a view, partly in section along the line 14—14 of Figure 13, showing the angular relation of the reflecting surfaces to the luminous source, an outer globe also being indicated;

Figure 15 is a view of still another embodiment of our invention; and

Figure 16 is a view, partly in section along line 16—16 of Figure 15, showing the angular relation of the reflecting surfaces to the luminous source and an outer globe.

Figure 1:
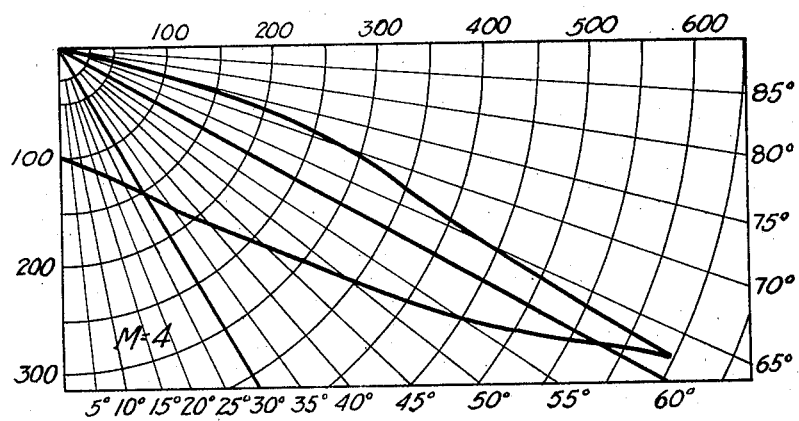
Fig. 1 is a diagram of the ideal prototype curve for attaining uniform horizontal illumination in a street surface where $M=4$.
Figure 2:
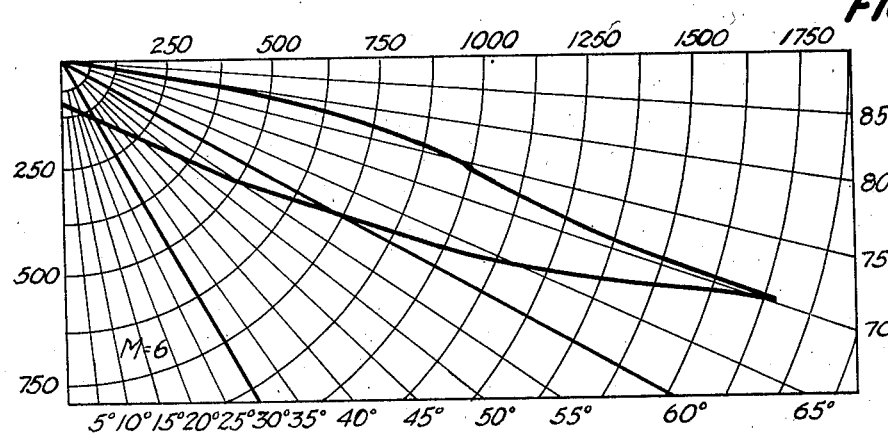
Fig. 2 is a diagram of the ideal prototype curve for similar street lighting where $M=6$.
Figure 3:
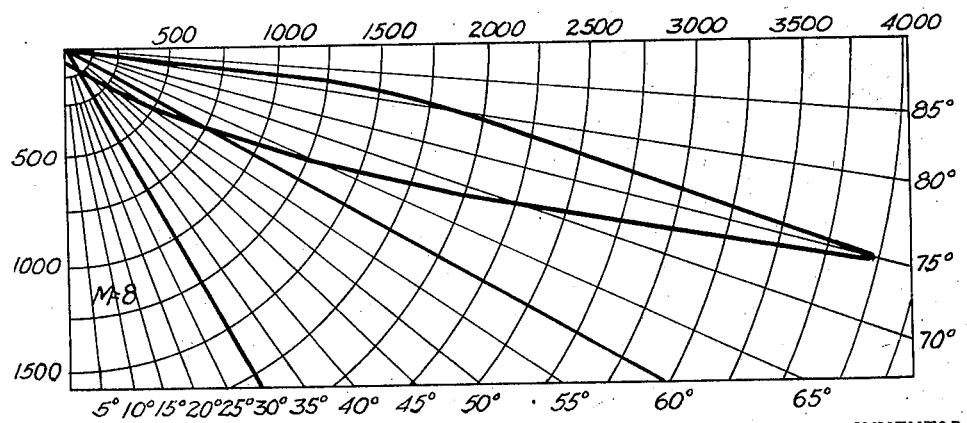
Fig. 3 is a diagram of the ideal prototype curve for similar street lighting where $M=8$.

In referring to the drawings and graphs, a series of symbols will be employed, a tabulation and description of which will now be given.

$a$=angular direction of a ray of light measured from the nadir or point directly below the lamp. This represents the Greek symbol alpha.

$cp$=candlepower of a light emitted from a street lighting unit in a direction along the angle $a$.

$K$=a constant governing the amount of flux included within the prototype curve.

$$M = \frac{\text{distance between adjacent light units}}{\text{height of light unit above street}}$$

$h$, $h'$, $h''$=various heights of the street-lighting units.

$D$, $D'$, $D''$=various spacing distances corresponding to the above mounting heights.

$d$, $d'$, $d''$=various distances from base of post to midpoints between units.

In planning a practical street lighting system utilizing our invention, it is only necessary to follow the procedure now to be described. If we assume that substantially uniform horizontal illumination on the street surface is the result desired and assuming, also, the value of $M=6$, we may calculate and construct, by means of the prototype curve-values given in Fig. 7, an ideal prototype curve.

Having constructed such a prototype curve of light-distribution, we now have an ideal to guide us in the design of the reflecting surface or surfaces, which are to be placed upon our electric light bulb so as to approach this ideal as closely as possible. Since the light emanating from the usual forms of electric light bulbs, when in its natural state, as far as the shape of its curve of distribution is concerned, is very poorly adapted to the production of effective, practical illumination of almost any specific work space and especially for the ideal uniform horizontal illumination of the streets, boulevards, highways, and other thoroughfares, as well as airports and other large outdoor public spaces, where planned scientific illumination is desired, it is necessary to so alter and remold the natural tore, or solid of light emitted by the bare street lamp as shown in curve A Fig. 10 as to reshape it into practical compliance with the shape indicated by the ideal prototype curve B in Fig. 10.

Fortunately it is within the ability of practical illuminating engineers, with the aid of our invention, to accomplish this purpose, because the crude mass of light sent out by the usual form of electric light bulbs is a very plastic medium, and each and every ray of it can, by the use of our invention, be easily bent by reflection and redirected into useful planes and the whole light-mass, molded into an ideal form for the solution of a given problem, such as planned scientific street lighting. It is with a structure which will produce the resultant transformation in an effective, efficient and useful manner that our invention is concerned.

In Fig. 10:

Curve A represents the light-distribution from a bare street-lighting lamp.

Curve B represents the light-distribution according to the prototype curve.

Curve C represents the light-distribution from a street-lighting unit constructed in accordance with our process.

Curve D represents the light-distribution from a street-lighting unit equipped with prismatic refractor.

We may now proceed with the transformation of the bare-lamp curve into the prototype by determining the additive and subtractive values of candlepower at all angles to reshape it for practical use.

$Ob$ from curve A (Fig. 10) = bare lamp $cp$ directed at angle $a$.

$Oc$ from curve B (Fig. 10) = required prototype $cp$ at angle $a$.

$bc$ (Fig. 10) = $cp$ required to be added to $Ob$ to produce $Oc$.

Since $Oc = Ob + bc$

Therefore $bc = Oc - Ob = cp$ required to be added to $Ob$ to produce $Oc$.

By repeating the above process for each 10 degrees, starting with 5° from the nadir, the required additive and subtractive candlepower needed at each angle can be ascertained.

Assuming that the candlepower value at the center of each 10 degree zone represents its average candlepower, the flux of light required to be added to each zone can be calculated by the aid of the following tables which gives the factors by which these candlepower values should be multiplied to give the zonal lumens or the lumens required in each 10 degree zone.

These factors are the equivalents of the actual square feet in these zones on a sphere of one-foot radius.

*Multiplying factors to obtain zone lumens from average zone candlepower*

| Zone | | Multiplying factor |
|---|---|---|
| 0 to 10° | 170 to 180° | 0.095 |
| 10 to 20° | 160 to 170° | 0.283 |
| 20 to 30° | 150 to 160° | 0.463 |
| 30 to 40° | 140 to 150° | 0.628 |
| 40 to 50° | 130 to 140° | 0.774 |
| 50 to 60° | 120 to 130° | 0.897 |
| 60 to 70° | 110 to 120° | 0.992 |
| 70 to 80° | 100 to 110° | 1.058 |
| 80 to 90° | 90 to 100° | 1.091 |

When extreme accuracy, or accuracy greater than that given by the above choice of 10 degree zones and their constants is desired, zonal angles of any desired magnitude may be chosen and in like manner their constants determined and used.

The 10 degree zone chosen herein is the one made use of in all practical work of this character in illuminating engineering.

To use these factors with the curve of any lighting unit, the candlepower at 5 degrees is multiplied by the 0 to 10 degrees factor to obtain lumens in the 0 to 10 degrees zone; the candlepower at 15 degrees is multiplied by the 10 to 20 degree zone factor to obtain the lumens in the 10 to 20 degree zone, etc. The total lumens for any large zone is the sum of the lumens thus determined in all of the 10 degree sections of the zone.

Having thus determined the deficiencies of the bare lamp-distribution in zonal lumens for each of the 10 degree zones as above outlined and having determined the required additive and subtractive lumens needed in each zone, we then spread a suitable specular reflective substance over such predetermined areas on the surface of the light bulbs itself to supply the already ascertained deficiencies in each zone.

We have found in practice, for instance, that when $M=6$ the top line of the upper reflecting surface on a bulb of the type illustrated in Figures 11 and 12, in which there are two reflecting surfaces employed, subtends an angle of 60 degrees at the center of the filament and the bottom line of the upper zonal reflector substance subtends an angle of 170 degrees at the center of the filament, when $M=6$ and the bulb is mounted base up. Inasmuch as the location of the center of the filament in manufactured lamps will not uniformly occupy the center position of the bulb, it is obvious that the exact position of these zones' boundaries will vary accordingly.

We have also found that the top line of the reflector substance of the lower zonal reflector surface subtends an angle of 60 degrees at the center of the filament, when $M=6$. We then so coat the surface or surfaces adjoining such of the zonal surfaces as are coated with the opaque specular reflective substance, as to soften and modify such portions of the prototype light-distribution curve produced by this zonal reflector surface as may be deemed beneficial for the particular location where the luminair is to be used.

The construction just described is shown in Figures 11 and 12, in which 20 indicates an incandescent lamp of a customary type, provided with a screw base 22 and a luminous source indicated at 24. The glass or bulb portion of the lamp comprises a substantially spherical portion 26, a substantially conical portion 28, and a cylindrical neck portion 30. At 32 is indicated a portion of the bulb which is coated with reflecting substance, and it will be observed that this portion embraces parts of the spherical surface and of the conical surface and that it is bounded by the lines or edges 34 and 36. Another reflecting coating 38, bounded by edge 40 is shown on the tip portion of the bulb. Adjacent to the edges 34, 36 and 40 are shown diffusing zones 42, 44 and 46, respectively. A globe 48 of conventional type is shown surrounding the bulb.

The angular relations of the reflecting zones to the luminous source are clearly shown in Figure 12.

In Figures 13 and 14 is shown another embodiment of our invention. A lamp 120, having a base 122, a luminous source 124, and a glass bulb comprising a spherical portion 126, a conical portion 128 and a neck portion 130, is shown as having a silvered surface 150 applied to the spherical portion thereof. This surface is bounded by edge 152 and adjacent thereto is a diffusing zone 154. A globe 156 surrounds the bulb.

In Figure 14 are shown the angular relations corresponding to a ratio $M=6$.

A third embodiment is shown in Figures 15 and 16, the lamp being indicated by 220, its base by 222, the luminous source by 224, and the spherical, conical and neck portions of the glass bulb by 226, 228 and 230 respectively. A silvered surface somewhat similar to surface 32 of Figure 11 is applied to the bulb and this is bounded by edges 262 and 264. Diffusing zones 266 and 268 are located adjacent these edges. Globe 270 is shown surrounding the bulb.

When the lamps are to be designed for other values of the ratio M, the angles indicated in the drawings assume different values which are summarized in the following table:

|  | $M=4$ | $M=6$ | $M=8$ |
|---|---|---|---|
| Fig. 12: |  |  |  |
| Upper surface: |  |  |  |
| Upper edge | 60° | 60° | 60° |
| Lower edge | 170° | 170° | 170° |
| Lower surface | 44° | 60° | 69° |
| Fig. 14 | 203° | 187° | 178° |

In Figures 11 to 16 of the drawings, we have illustrated embodiments of our invention in which the diffusing areas are shown as merging into the reflecting areas and as of indefinite extent, and where the diffusing areas are in the form of zonal areas located on opposite sides of such reflecting area. It will be understood, of course, that certain general objects of our invention can be attained by giving the diffusing areas a limited extent and other objects served by making them extend through the entire transmitting area of the bulb. It will also be understood that for certain purposes it may not be necessary that the diffusing areas merge into the reflecting areas.

Having thus described our invention and illustrated its use, what we claim as new and desire to secure by Letters Patent is:—

1. An electric bulb to serve as a unit in a street lighting system in which a plurality of units are to be mounted in uniformly spaced relation with reference to each other and mounted at a uniform height with reference to the street to be illuminated, said bulb being adapted for use with its base uppermost, and having a filament which is relatively condensed about its focal point area enclosed in a casing portions of which are transparent, and means associated with said casing for modifying the light distribution to change the normal bare lamp light distribution into an approximation of a prototype distribution of light flux, said means comprising an opaque specular reflective medium upon an area of the bulb casing consisting of spherical portions and conical portions and also a second area upon a spherical portion at the tip of the bulb, opposed to its base, said reflecting areas serving to supplement the direct light with reflected light so that the light is distributed to give an approximation to prototype street lighting, the extent, location and configuration of said areas in their relation to the light source being dependent upon the ratio M of the distance between the units to their elevation above the street surface, and being such as to give for each unit approximately the prototype light distribution curve called for by the particular ratio, and said first-mentioned area for a ratio of $M=6$, comprising spherical and conical portions positioned above the plane of the focal point when the bulb is in use and being in the form of a continuous zonal area, the upper boundary of which is subtended by an angle of approximately 60° at the focal point and the lower boundary of which is subtended by an angle of approximately 170° at the focal point, and said area at the tip portion of the bulb for a ratio of $M=6$ being in the form of a polar cap located below the plane of the focal point when the bulb is in use.

2. An electric bulb to serve as a unit in a street lighting system in which a plurality of units are to be mounted in uniformly spaced relation with reference to each other and mounted at a uniform height with reference to the street to be illuminated, said bulb being adapted for use with its base uppermost, and having a filament which is relatively condensed about its focal point area enclosed in a casing portions of which are transparent, and means associated with said casing for modifying the light distribution to change the normal bare lamp light distribution curve into an approximation of a prototype distribution of light flux, said means comprising an opaque specular reflective medium upon an area of the bulb casing consisting of spherical portions and conical portions and also a second area upon a spherical portion at the tip of the bulb opposed to its base, said reflecting areas serving to supplement the direct light with reflected light so that the light is distributed to give an approximation to prototype street lighting, the extent, location and configuration of said areas in their relation to the light source being dependent upon the ratio M of the distance between the units to their elevation above the street surface, and being such as to give for each unit approximately the prototype light distribution curve called for by the particular ratio, and said first-mentioned area, for a ratio of $M=6$, comprising spherical and conical portions positioned above the plane of the focal point when the bulb is in use and being limited to a continuous zonal area, the upper boundary of which is subtended by an angle of approximately 60° at the focal point and the lower boundary of which is subtended by an angle of approximately 170° at the focal point.

3. An electric bulb to serve as a unit in a street lighting system in which a plurality of units are to be mounted in uniformly spaced relation with reference to each other and mounted at a uniform height with reference to the street to be illuminated, said bulb being adapted for use with its base uppermost, and having a filament which is relatively condensed about its focal point area enclosed in a casing portions of which are transparent, and means associated with said casing for modifying the light distribution to change the normal bare lamp light distribution curve into an approximation of a prototype distribution of light flux, said means comprising an opaque specular reflective medium upon an area of the bulb positioned above the focal point when the lamp is in use and also upon an area on the lowermost portion of the bulb when the lamp is in use, said reflecting areas serving to supplement the direct light with reflected light so that the light is distributed to give an approximation to prototype street lighting, the extent, location and configuration of said areas in their relation to the light source being dependent upon the ratio M of the distance between the units to their elevation above the street surface, and being such as to give for each unit approximately the prototype light distribution curve called for by the particular ratio, said upper area, for a ratio of $M=6$, being limited to a continuous zonal area, the upper boundary of which is subtended by an angle of approximately 60° at the focal point and the lower boundary of which is subtended by an angle of approximately 170° at the focal point, and said lower area on the tip portion of the bulb, for a ratio of $M=6$, being in the form of a polar cap having its upper boundary subtended at the focal point by an angle of 60°, and relatively narrow zonal areas of the uncoated bulb surface contiguous to the boundaries of the coated areas being light diffusing, so as to soften the effect of the cut-off at the boundaries of the reflecting surfaces.

4. An electric bulb to serve as a unit in a street lighting system in which a plurality of units are to be mounted in uniformly spaced relation with reference to each other and mounted at a uniform height with reference to the street to be illuminated, said bulb being adapted for use with its base uppermost, and having a filament which is relatively condensed about its focal point area enclosed in a casing portions of which are transparent, and means associated with said casing for modifying the light distribution to change the normal bare lamp light distribution into an approximation of a prototype distribution of light flux, said means comprising an opaque specular reflective medium upon an area of the bulb casing consisting of spherical portions and conical portions and also a second area upon a spherical portion at the tip of the bulb, opposed to its base, said reflecting areas serving to supplement the direct light with reflected light so that the light is distributed to give an approximation to prototype street lighting, the extent, location and configuration of said areas in their relation to the light source being dependent upon the ratio M of the distance between the units to their elevation above the street surface, and being such as to give for each unit approximately the prototype light distribution curve called for by the particular ratio, and said first-mentioned area, for a ratio of $M=6$, comprising spherical and conical portions positioned above the plane of the focal point when the bulb is in use and being in the form of a continuous zonal area, the upper boundary of which is subtended by an angle of approximately 60° at the focal point and the lower boundary of which is subtended by an angle of approximately 170° at the focal point, and said area at the tip portion of the bulb for a ratio of $M=6$ being in the form of a polar cap located below the plane of the focal point when the bulb is in use, and having its upper boundary subtended at the focal point by an angle of approximately 60°.

MORRIS B. BECK.
JOHN D. WHITTAKER.